No. 768,524. PATENTED AUG. 23, 1904.
A. B. DRAKE.
TIRE HEATING MACHINE OR APPARATUS.
APPLICATION FILED FEB. 14, 1902.
NO MODEL.
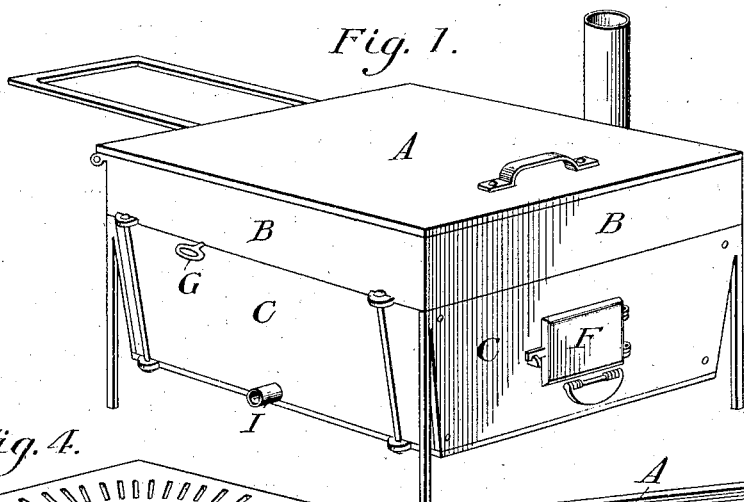
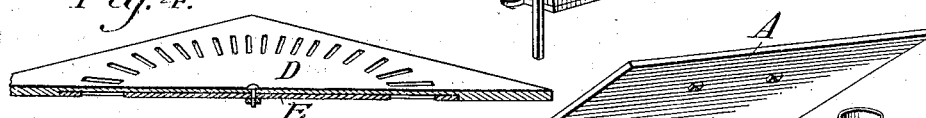
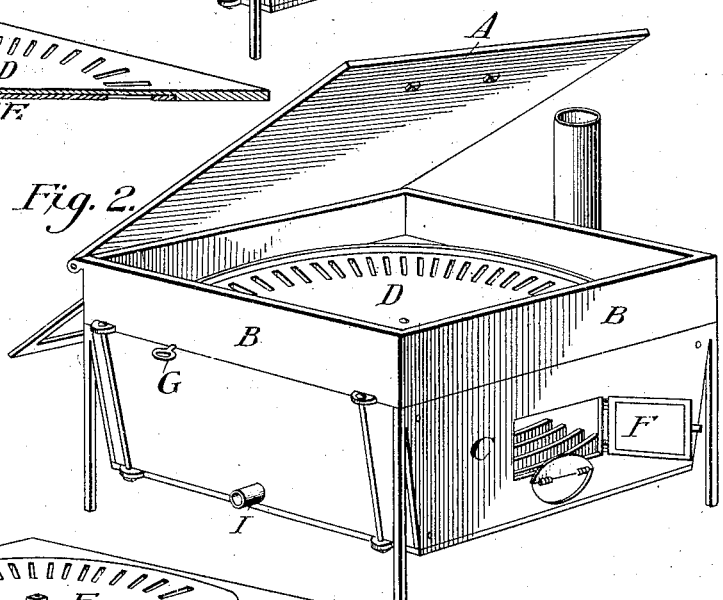
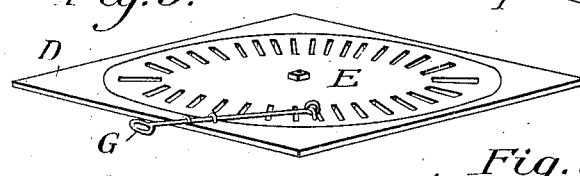
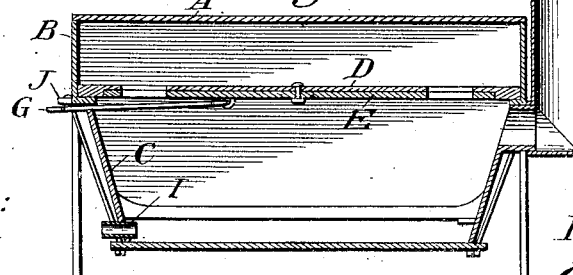
Witnesses:
Inventor:

No. 768,524.

Patented August 23, 1904.

UNITED STATES PATENT OFFICE.

ALVIN BOYD DRAKE, OF GOODLETTSVILLE, TENNESSEE.

TIRE-HEATING MACHINE OR APPARATUS.

SPECIFICATION forming part of Letters Patent No. 768,524, dated August 23, 1904.

Application filed February 14, 1902. Serial No. 94,106. (No model.)

*To all whom it may concern:*

Be it known that I, ALVIN BOYD DRAKE, a citizen of the United States, residing at Goodlettsville, in the county of Davidson and State of Tennessee, have invented a new and useful Tire-Heating Machine or Apparatus, of which the following is a specification.

My invention relates to a machine or apparatus for heating iron, steel, or other metal tires for vehicles, which tires have to be heated before placing them on wheels, and in which machine or apparatus the fire is in a small inclosed fire-box, with blower attachment, and a receptacle or place for placing the tires when they are to be heated directly over the fire and which receptacle has holes or perforations which may be opened or closed at will to admit or exclude the heat; and the objects of my invention or improvement are, first, to provide a machine or apparatus with an inclosed fire for the purpose of heating tires of metal and to prevent the same from coming directly in contact with the fire; second, to obviate the necessity of building an open fire for the purpose of heating the tires and the consequent waste of fuel in such open fires; third, to provide a machine or apparatus in which many tires may be heated at once and from which one or more tires may be removed without disturbing the fire or heating process of the remaining tires by arranging a receptacle over the fire with a cover and which receptacle has a perforated bottom which may be opened or closed at will to admit or exclude the heat; fourth, to provide a machine or apparatus which will heat uniformly the tires.

I attain these objects by the mechanism and apparatus and combinations illustrated in the accompanying drawings, in which—

Figure 1 is a perspective view of the entire machine or apparatus as it appears with the top or cover closed down. Fig. 2 is a similar view of the entire machine or apparatus as it appears with the top or cover partly raised and the fire-box door open and the ash-box door open. Fig. 3 is the bottom of the receptacle for the tires as it appears on the under side next to the fire and showing the movable disk E with perforations; Fig. 4, a cross-section of the bottom of the tire-receptacle as it appears from the top and showing the perforations or holes in the bottom of the receptacle. Fig. 5 is a transverse vertical section of the apparatus.

Similar letters refer to similar parts throughout the several views.

The machine or apparatus may be of iron, steel, or other metal or fire-resisting non-combustible material. The top or cover A is the cover or top of the tire-receptacle, which may be raised or lowered at will by a handle on the top, near the front, or by a long handle projecting at the rear. The sides of the tire-receptacle B consist of one casting, which is bolted by long bolts to the bottom of the fire-box, the bolts running on the outside of the fire-box. The sides of the fire-box C consist of two pieces on the sides independent of the legs or posts and two pieces which are cast with the four legs or posts, upon which legs or posts the machine or apparatus stands, clearing the floor at convenient distance. The bottom of the tire-receptacle D has a number of perforations, which when the disk E is moved, by means of the rod G, bringing similar perforations in line, admits the heat directly to the tires in the tire-receptacle. The bottom of the tire-receptacle D rests on projections above the fire at convenient distance, and the whole of this bottom D may be removed at will.

The door to the fire-box F admits the firing of the machine or apparatus, and any solid fuel may be fed to the fire. The fire rests on an ordinary grate, allowing the ashes to drop into an ash-receptacle below the fire, and which ashes may be removed through a small door directly below the door F.

The rod G is the rod by which the disk E may be moved at will either to close or open the perforations, bringing the perforations in the disk E in line with the perforations in the bottom of the tire-receptacle D, thereby admitting heat directly to the tires in the tire-receptacle.

H is a tire as it lies directly over the perforations in the tire-receptacle during the process of heating.

I represents the hole and tube running to the fire-box, to which any blowing apparatus may be attached and through which the forced draft is to pass. The bottom of the fire-box is held in place by the long bolts running to the sides of the tire-receptacle B. A flue is provided on the side C directly opposite the blow-hole I, and situated in the side C, just below the tire-receptacle, is a small pipe to be attached to the flue to carry away the smoke.

The disk E is held in place and turned on a bolt through the center, holding it to the bottom of the tire-receptacle D.

I do not know of any machine or apparatus of this character for the purpose of heating tires. I therefore claim broadly with reference to such a machine or apparatus, as well as all combinations of the same, and I claim all this as my invention.

What I desire to secure by Letters Patent is—

1. In a tire-heating furnace, the combination of a tire-heating chamber with a fire-box below the same provided with a grate, and having a plate in the top with openings, said openings communicating with said chamber and admitting flame thereto, and means for regulating the size of said openings, substantially as described.

2. In a tire-heating furnace, the combination of a tire-heating chamber with a fire-box below the same provided with a grate, and having a fixed plate in its top with openings, said openings communicating with said chamber and admitting flame thereto, a second plate rotatably attached to said fixed plate and having openings adapted to register with the openings of said fixed plate, and means by which the movable plate may be rotated from the exterior of said tire-heating chamber for modifying or closing the openings in said fixed plate.

3. In a tire-heating furnace, the combination of a tire-heating chamber with a fire-box below the same, said chamber consisting of a square frame with a tight close-fitting hinged cover, a bottom upon which the tire rests having openings communicating with said fire-box and admitting flame to said chamber, a disk having openings adapted to register with the openings in said bottom rotatably attached to said bottom by a bolt through its center so as to afford means for regulating the size of the openings communicating with said fire-box, or for entirely closing said openings, and means for rotating said disk from the exterior of said tire-heating chamber and fire-box, a grate in said fire-box so situated as to leave space below said grate for ashes, openings in said fire-box for introducing fuel and removing ashes, a pipe connected with said fire-box at one side and below the grate for introducing blast, and a flue at the opposite side and near the top of said fire-box for carrying off the products of combustion, all substantially as described.

In testimony whereof I have signed my name to this specification in presence of two subscribing witnesses.

ALVIN BOYD DRAKE.

Witnesses:
 BENJAMIN F. MYERS,
 JOHN F. JOYNER.